US009686486B2

(12) United States Patent
Mauritzson et al.

(10) Patent No.: US 9,686,486 B2
(45) Date of Patent: Jun. 20, 2017

(54) MULTI-RESOLUTION PIXEL ARCHITECTURE WITH SHARED FLOATING DIFFUSION NODES

(71) Applicant: SEMICONDUCTOR COMPONENTS INDUSTRIES, LLC, Phoenix, AZ (US)

(72) Inventors: Richard A. Mauritzson, Meridian, ID (US); Marko Mlinar, Horjul (SI)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 29 days.

(21) Appl. No.: 14/723,233

(22) Filed: May 27, 2015

(65) Prior Publication Data

US 2016/0353034 A1 Dec. 1, 2016

(51) Int. Cl.
*H04N 5/347* (2011.01)
*H04N 5/355* (2011.01)
*H04N 5/3745* (2011.01)
*H04N 5/353* (2011.01)
*H04N 5/343* (2011.01)
*H04N 9/04* (2006.01)

(52) U.S. Cl.
CPC ............. *H04N 5/347* (2013.01); *H04N 5/343* (2013.01); *H04N 5/3535* (2013.01); *H04N 5/3559* (2013.01); *H04N 5/35554* (2013.01); *H04N 5/37457* (2013.01); *H04N 9/045* (2013.01)

(58) Field of Classification Search
CPC ...... H04N 5/343; H04N 5/347; H04N 5/3535; H04N 5/35545; H04N 5/35554; H04N 5/3745; H04N 5/37457; H04N 9/045
See application file for complete search history.

(56) References Cited

U.S. PATENT DOCUMENTS

| | | | |
|---|---|---|---|
| 7,020,353 B1 | 3/2006 | McCaffrey et al. |
| 7,511,716 B2 | 3/2009 | Berestov et al. |
| 7,745,779 B2 | 6/2010 | Conners |
| 7,773,138 B2 | 8/2010 | Lahav et al. |
| 7,829,832 B2 | 11/2010 | Mauritzson et al. |

(Continued)

OTHER PUBLICATIONS

Korobov et al., U.S. Appl. No. 14/290,814, filed May 29, 2014.

(Continued)

*Primary Examiner* — Daniel M Pasiewicz
(74) *Attorney, Agent, or Firm* — Treyz Law Group, P.C.; Zachary D. Hadd

(57) ABSTRACT

An image sensor may include an array of image photodiodes formed in rows and columns. The array of image photodiodes may include a region of photodiodes arranged in three adjacent rows and three adjacent columns of the array. The region of photodiodes may include four non-adjacent photodiodes, each of which generates charge in response to the same color of light. The four non-adjacent photodiodes may be coupled to a shared floating diffusion node. Each of the four non-adjacent photodiodes may transfer generated charge to the shared floating diffusion node. The charges from each of the four non-adjacent photodiodes may be summed at the shared floating diffusion node and read out as a summed signal or may be individually transferred to the shared floating diffusion node and read out individually.

21 Claims, 8 Drawing Sheets

(56) References Cited

U.S. PATENT DOCUMENTS

| | | | |
|---|---|---|---|
| 8,031,249 B2* | 10/2011 | McKee | H01L 27/14603 348/294 |
| 8,130,304 B2 | 3/2012 | Yin et al. | |
| 8,179,463 B1 | 5/2012 | Geurts | |
| 8,599,284 B2 | 12/2013 | Mo et al. | |
| 8,610,186 B2 | 12/2013 | Tanaka | |
| 8,730,330 B2 | 5/2014 | Solhusvik et al. | |
| 8,913,166 B2* | 12/2014 | Okita | H04N 5/343 348/294 |
| 9,029,972 B2 | 5/2015 | Nagaraja | |
| 2009/0108176 A1 | 4/2009 | Blanquart | |
| 2009/0256940 A1* | 10/2009 | Pahr | H04N 5/3698 348/308 |
| 2010/0026865 A1* | 2/2010 | Tivarus | H01L 27/14641 348/308 |
| 2010/0073462 A1* | 3/2010 | Lee | H04N 5/347 348/46 |
| 2012/0002089 A1 | 1/2012 | Wang et al. | |
| 2012/0025060 A1* | 2/2012 | Iwata | H01L 27/14603 250/208.1 |
| 2013/0021441 A1* | 1/2013 | Kim | H04N 5/3745 348/46 |
| 2013/0242148 A1 | 9/2013 | Mlinar et al. | |
| 2013/0292548 A1 | 11/2013 | Agranov et al. | |
| 2014/0027613 A1* | 1/2014 | Smith | H04N 5/2352 250/208.1 |
| 2014/0263951 A1 | 9/2014 | Fan | |
| 2015/0002635 A1* | 1/2015 | Kawai | H04N 5/23212 348/46 |
| 2015/0002709 A1 | 1/2015 | Masagaki | |
| 2015/0312537 A1* | 10/2015 | Solhusvik | H04N 9/045 348/302 |

OTHER PUBLICATIONS

Mauritzson et al., U.S. Appl. No. 14/295,203, filed Jun. 3, 2014.
Tekleab, U.S. Appl. No. 14/543,793, filed Nov. 17, 2014.

* cited by examiner

MULTI-RESOLUTION PIXEL ARCHITECTURE WITH SHARED FLOATING DIFFUSION NODES

BACKGROUND

This relates generally to imaging devices, and more particularly, to imaging devices with photodiodes having charge-summing capabilities.

Image sensors are commonly used in electronic devices such as cellular telephones, cameras, and computers to capture images. In a typical arrangement, an electronic device is provided with an array of image pixels arranged in pixel rows and pixel columns. The image pixels contain a single photodiode for generating charge in response to image light. The charge generated by the image pixels is stored at a floating diffusion node coupled to the image pixels. Circuitry is commonly coupled to each pixel column for reading out image signals from the image pixels.

Conventional imaging systems employ a single image sensor in which the visible light spectrum is sampled by red, green, and blue (RGB) image pixels arranged in a Bayer mosaic pattern. The Bayer mosaic pattern consists of a repeating unit cell of two-by-two image pixels, with two green pixels diagonally opposite one another, and the other corners being red and blue.

In certain applications, it may be desirable to store charge from multiple pixels on a single shared floating diffusion node. In conventional imaging systems that implement a Bayer mosaic pattern, adjacent pixels of different colors in a single column of the image pixel array or adjacent pixels in a Bayer mosaic unit cell share a common floating diffusion node on which charge from the pixels is be stored prior to read-out. Charge corresponding to each pixel color is separately stored on and read out from the shared floating diffusion node. However, such conventional arrangements in which multiple pixels of different colors in a Bayer mosaic pattern share a common floating diffusion node are not ideal for floating diffusion node summing or charge binning. For example, some conventional arrangements couple four pixels in the Bayer mosaic array to a common floating diffusion node (i.e., four pixels arranged in a common column or four pixels arranged in a unit cell of the Bayer pattern). In such an arrangement, however, the number of pixels of a common color plane that can share a common floating diffusion node is limited, and only a partial summing of charges can be obtained on the array. In some scenarios in which binning of charges from additional pixels is desired, summing operations are performed off-array using the analog or digital periphery logic. However, off-array summing operations increase power consumption and potentially add noise to the summed signals. In other scenarios, more adjacent pixels of different colors in the array are configured to share the common floating diffusion node in order to increase the number of pixels for which charges can be summed. However, arrangements in which more pixels (i.e., nine adjacent pixels of different colors) are coupled to the same floating diffusion node exhibit low conversion gain, decreased voltage sensitivity due to decreased voltage swing at the floating diffusion node, and increased floating diffusion node noise.

In other imaging systems that include pixel arrays with unit cells of two-by-two adjacent pixels of the same color, the adjacent pixels share a common floating diffusion node on which charge is stored prior to read-out. Charge for each unit cell of four pixels of the same color is summed at and read out from the shared floating diffusion node. Because such imaging systems do not use a Bayer mosaic pattern, however, it can be difficult to generate an image having the full-resolution characteristics associated with images generated by sensors that do use the Bayer mosaic pattern.

It would therefore be desirable to be able to provide imaging devices with improved charge-summing capabilities.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
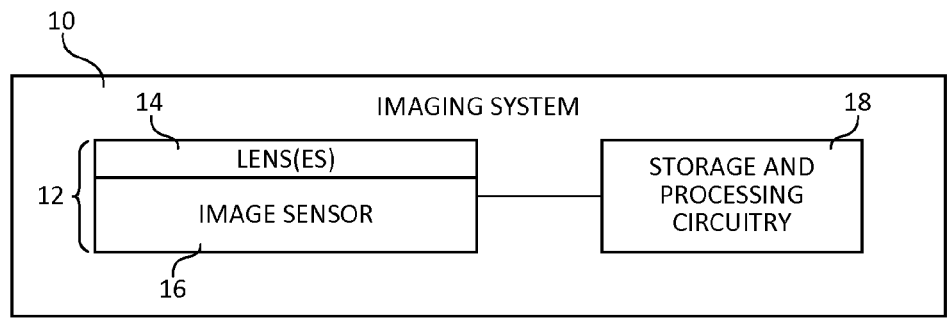
FIG. 1 is a diagram of an illustrative electronic device having an image sensor and processing circuitry for capturing images using a pixel array having image pixels with shared floating diffusion nodes in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
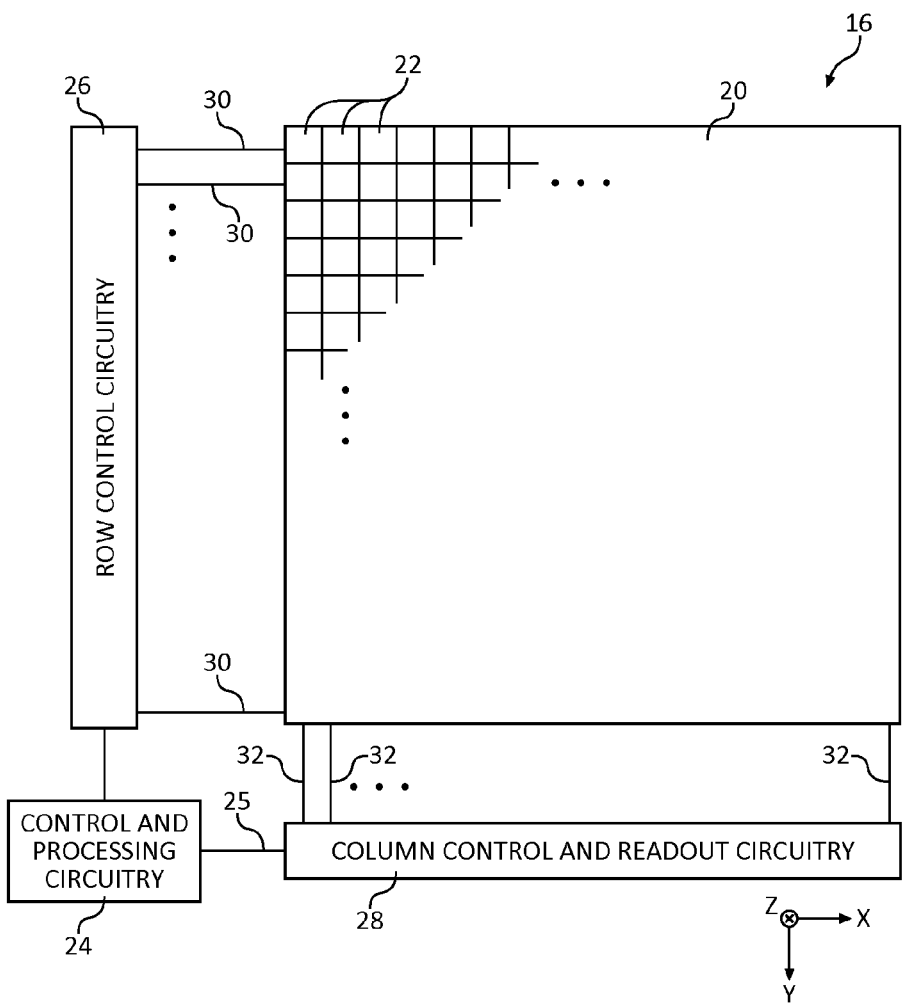
FIG. 2 is a diagram of an illustrative pixel array and associated readout circuitry for reading out image signals from the pixel array in accordance with an embodiment of the present invention.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Figure 3:
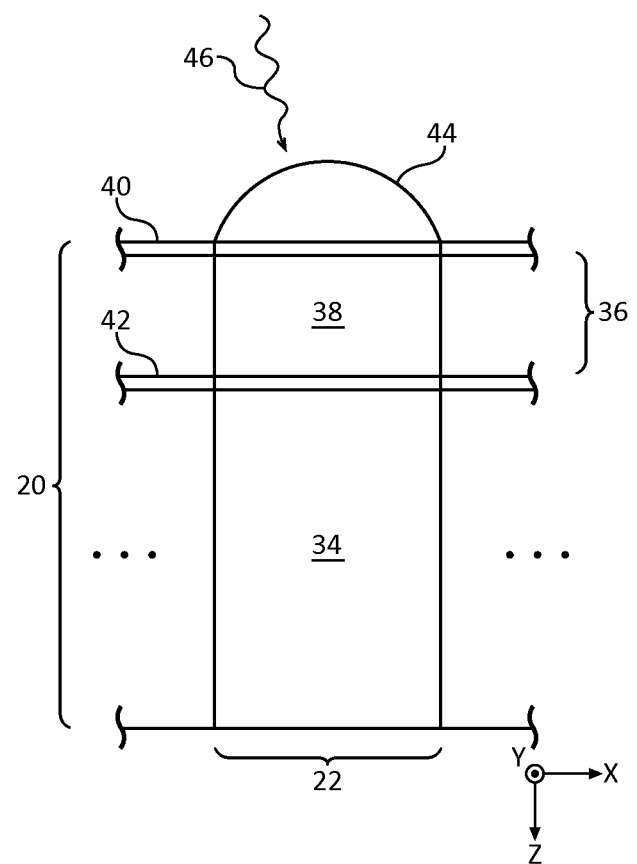
FIG. 3 is a cross-sectional diagram of an illustrative image pixel having a photosensitive region and a color filter element for passing light of a corresponding color to the photosensitive region in accordance with an embodiment of the present invention.

FIG. 3 is an illustrative cross-sectional diagram of an image pixel 22 in array 20. As shown in FIG. 3, a color filter array such as color filter array 36 may be formed over photosensitive regions 34 (sometimes referred to herein as photodiodes) in array 20 so that a desired color filter element 38 in color filter array 36 is formed over an upper surface of the photosensitive region 34 of an associated pixel 22. A microlens such as microlens 44 may be formed over an upper surface of color filter array 36 to focus incoming light such as image light 46 onto the photosensitive region 34 associated with that pixel 22. Incoming light 46 may be focused onto photosensitive region 34 by microlens 44 and may pass through color filter element 38 so that only light of a corresponding color is captured at photosensitive region 34. If desired, optional masking layer 40 may be interposed between color filter element 38 and microlens 44 for one or more pixels 22 in array 20. In another suitable arrangement, optional masking layer 42 may be interposed between color filter element 38 and photosensitive region 34 for one or more pixels 22 in array 20. Masking layers 40 and 42 may include metal masking layers or other filtering layers that block a portion of image light 46 from being received at photosensitive region 34. Masking layers 40 and 42 may, for example, be provided to some image pixels 22 to adjust the effective exposure level of corresponding image pixels 22 (e.g., image pixels 22 having masking layers may capture less light relative to image pixels 22 without masking layers). If desired, image pixels 22 may be formed without any masking layers.

If desired, pixels 22 in array 20 of FIG. 2 may be provided with an array 36 of color filter elements 38 that each pass one or more colors of light. All or some of pixels 22 may be provided with a color filter element. Color filter elements for pixels 22 may be red color filter elements (e.g., photoresistive material that passes red light while reflecting and/or absorbing other colors of light), blue color filter elements (e.g., photoresistive material that passes blue light while reflecting and/or absorbing other colors of light), and/or green color filter elements (e.g., photoresistive material that passes green light while reflecting and/or absorbing other colors of light). Color filter elements may also be configured to filter light that is outside the visible human spectrum. For example, color filter elements may be configured to filter ultraviolet or infrared light (e.g., a color filter element may only allow infrared light or ultraviolet light to reach the photodiode). Color filter elements may configure image pixel 22 to only detect light of a certain wavelength or range of wavelengths (sometimes referred to herein as a wavelength band) and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Magenta color filter elements that are configured to pass red and blue light may be also be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels. Image signals generated by broadband image pixels may sometimes be referred to herein as broadband image signals. Broadband image pixels may have a natural sensitivity defined by the material that forms the broadband color filter element and/or the material that forms the image sensor pixel (e.g., silicon). In another suitable arrangement, broadband image pixels may be formed without any color filter elements. The sensitivity of broadband image pixels may, if desired, be adjusted for better color reproduction and/or noise characteristics through use of light absorbers such as pigments. In contrast, "colored" pixel may be used herein to refer to image pixels that are primarily sensitive to one color of light (e.g., red light, blue light, green light, or light of any other suitable color). Colored pixels may sometimes be referred to herein as narrowband image pixels because the colored pixels have a narrower spectral response than the broadband image pixels.

If desired, narrowband pixels and/or broadband pixels that are not configured to be sensitive to infrared light may be provided with color filters incorporating absorbers of NIR radiation. Color filters that block near-infrared light may minimize the impact of infrared light on color reproduction in illuminants containing both visible and infrared radiation.

As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images. In another suitable example, the green pixels in a Bayer pattern are replaced by broadband image pixels having broadband color filter elements. These examples are merely illustrative and, in general, color filter elements of any desired color and in any desired pattern may be formed over any desired number of image pixels 22.

Figure 4:
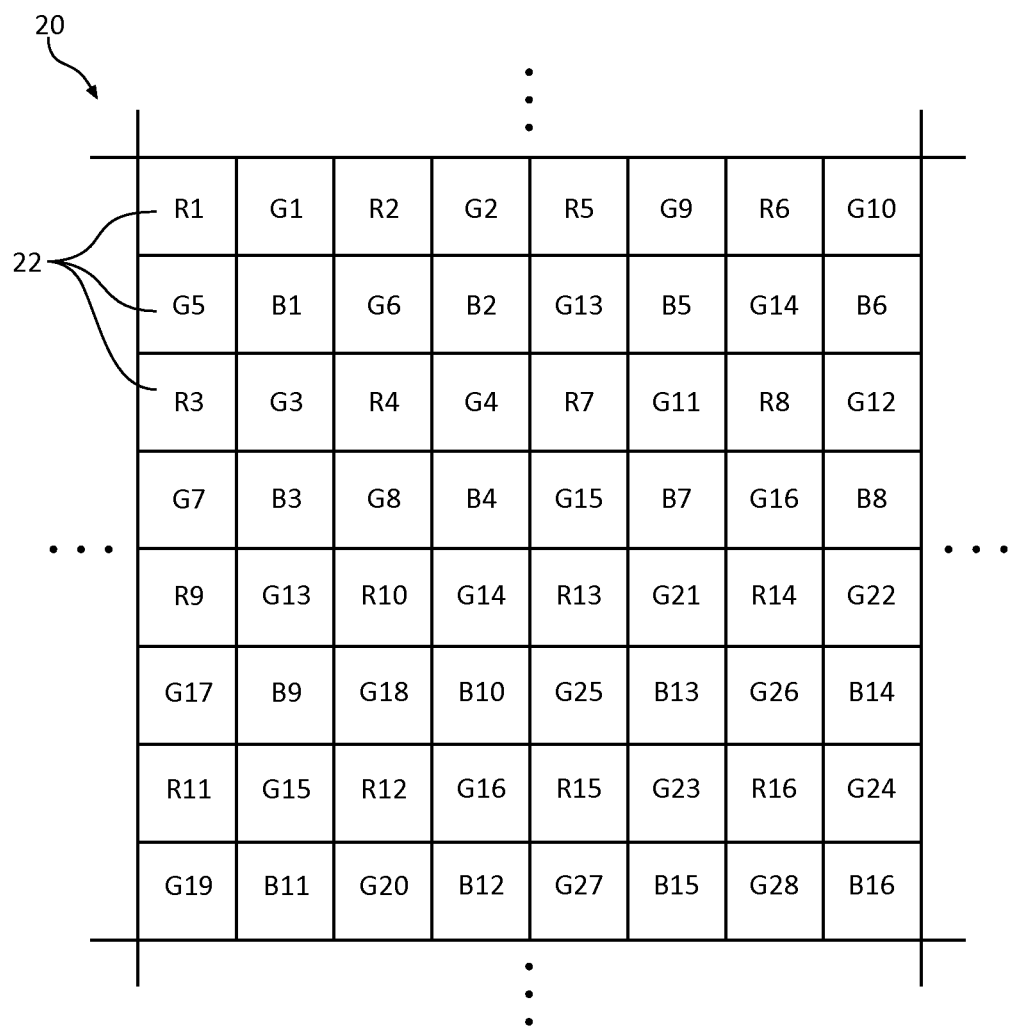
FIG. 4 is a diagram of a portion of an illustrative pixel array that may include image pixels that share a common floating diffusion node in accordance with an embodiment of the present invention.

An illustrative example a portion of pixel array 20 in which pixels 22 are arranged in a Bayer mosaic pattern of repeating two pixel by two pixel unit cells is shown in FIG. 4. In some scenarios, each of the four adjacent pixels in a single Bayer mosaic unit cell may share a common floating diffusion node. For example, adjacent image pixels R1, G1, G5, and B1 may all share a common floating diffusion node. In such an arrangement, charge accumulated at image pixel R1 may be transferred to the common floating diffusion node and then read out. At a different time, charge accumulated at image pixel B1 may be transferred to the common floating diffusion node and then read out. At yet another different time, charge accumulated at image pixels G1 and/or G5 may be transferred to the common floating diffusion node and then read out. If desired, charge from both image pixels G1 and G5 may be transferred to the shared floating diffusion node. In other words, charge from image pixels G1 and G5 may be "summed" or "binned" on the shared floating diffusion node and then read out as a single signal representative of the combined charge of pixel G1 and pixel G5. However, such arrangements in which only four adjacent pixels of different colors in a Bayer pattern share a common floating diffusion node offer limited charge summing capabilities. In the scenario described above, for example, only two green pixels share the common floating diffusion node such that only charge from those two green pixels may be summed on the array. Because only one red pixel and one blue pixel share the floating diffusion node, on-array summing of charges from the red image pixel and blue image pixel with signals from other pixels of the same color plane cannot be performed. While off-array binning operations may be performed using digital or analog periphery logic to allow for summing of charges of additional pixel signals (i.e., summing blue or red pixel signals, or summing more than two green pixel signals), additional processing associated with off-array binning may increase power consumption and noise in the binned signals. If more pixels are be coupled to the shared floating diffusion node to allow for on-array binning of charges from additional pixels of the same color plane, floating diffusion node capacitance may increase, resulting in lower conversion gain, decreased voltage sensitivity, and increased noise in comparison to arrangements in which fewer pixels share a common floating diffusion node.

In accordance with an embodiment of the present invention that is sometimes described herein as an example, a single floating diffusion node may be shared between four non-adjacent pixels of the same color (e.g., four pixels of a similar color plane) that are formed as part of an image pixel array in which the pixels are arranged in a Bayer mosaic pattern. In the arrangement shown in FIG. 4, each of non-adjacent pixels R1, R2, R3, and R4 in a three-pixel-by-three-pixel region of array 20 may each share a single floating diffusion node, for example.

In the illustrative example of FIG. 4, charge may be generated (e.g., accumulated) at each of pixels R1, R2, R3, and R4. The charge accumulated at each of pixels R1-R4 may be individually transferred to the shared floating diffusion node. For example, charge may accumulate at pixel R1 and be transferred to the shared floating diffusion node. The charge from pixel R1 may then be read out. At a different time, charge accumulated at pixel R2 may be transferred to the floating diffusion node, and then be read out. Charge accumulated at pixels R3 and R4 may be transferred to the shared floating diffusion node and read out in a similar fashion. By transferring and reading out charge from each of pixels R1-R4 individually, a high-resolution (full-resolution) image generated by image pixels 22 may be generated using a shared floating diffusion node. In one suitable scenario, charge accumulated at each of pixels R1-R4 may be transferred to and individually read out from a shared floating diffusion node in accordance with a full-resolution (high resolution) image capture mode. When operated in a full-resolution image capture mode, image sensor 16 may generate images having similar resolution and other characteristics to images generated by conventional imaging systems that employ the Bayer mosaic pattern.

In another illustrative example, charge accumulated at each of pixels R1, R2, R3, and R4 may be transferred to a shared floating diffusion node such that the charge accumulated at each of the pixels is simultaneously stored on the shared floating diffusion node. In other words, charge from image pixels R1, R2, R3, and R4 may summed or binned on the shared floating diffusion node and then read out as a single signal (i.e., a summed signal) representative of the combined charge accumulated at pixels R1-R4. By summing the charge accumulated at image pixels R1-R4 on the shared floating diffusion node, an image having a lower resolution (reduced resolution) than the full-resolution image may be generated. Because summed charges are generated by pixels of the same color plane (i.e., pixels that generate charge in response to the same color of light), the signal-to-noise ratio of image signals generated by the pixels at low exposure and/or low light levels may be increased. Moreover, because charge from four pixels is read out simultaneously (as opposed to charge from each pixel being read out individually), power consumption of the image sensor may be reduced relative to a scenario in which charge generated by each of the four pixels is read out individually and summed using the analog or digital periphery logic that is located off of the pixel array. In one suitable scenario, charge accumulated at each of pixels R1-R4 may be transferred to, stored on, and simultaneously read out from a shared floating diffusion node in accordance with a reduced-resolution (low-resolution) image capture mode.

The examples described above in connection with pixels R1-R4 may also apply to other sets or clusters (groups) of pixels 22 that generate charge in response to a given color of light. For example, pixels G1, G2, G3, and G4 may share a common floating diffusion node, pixels R5, R6, R7, and R8 may share a common floating diffusion node, pixels G9, G10, G11, and G12 may share a common floating diffusion node, etc. In a full-resolution image capture mode, charge accumulated at each of pixels G1-G4 may be separately transferred to and individually read out from the shared floating diffusion node to generate a full-resolution output, for example. In a reduced-resolution image capture mode, charge accumulated at each of pixels G1-G4 may be summed at the shared floating diffusion node and simultaneously read out as a single signal to generate a reduced-resolution output. Groups of pixels G5-G8 and B1-B4 may also each share a floating diffusion node and may generate full-resolution and reduced-resolution outputs as described in connection with pixels R1-R4 and G1-G4. If desired, pixel array 20 may include multiple clusters of pixels of the same color plane such that each cluster shares a separate common floating diffusion node. In some examples, each of the clusters may include four and only four non-adjacent pixels of the same color that share the common floating diffusion node. In yet another example, four non-adjacent pixels of a first color and four non-adjacent pixels of a second color that is different than the first color (i.e., eight pixels total) may share a common floating diffusion node and may be the only pixels that share the common floating diffusion node. If desired, four of the eight pixels (e.g., two pixels of the first color and two pixels of the second color) may be formed in a first column of the array, while the remaining four pixels (e.g., two pixels of the first color and two pixels of the second color) are formed in a second column of the array that is not adjacent to the first column. In general, the pattern described above may extend across any desired number of pixels in array 20 or all of pixel array 20 such that each pixel 22 shares a floating diffusion node with other pixels of a similar color plane.

In one suitable arrangement, nine pixels 22 in pixel array 20 that each generate image signals in response to the same color of light may share a common floating diffusion region 54. In such a scenario, the nine pixels 22 may be arranged in five columns and five rows in pixel array 20. For example, each of pixels R1-R5, R7, R9, R10, and R13 may share a common floating diffusion node 54. When such a configuration is used in a low-resolution mode, the single summed charge that accumulates at shared floating diffusion node 54 may have a center of gravity spatially located at pixel R4 (i.e., a red image pixel at the center of the nine pixels for which the charges are summed). Because this summed charge from the red image pixels spatially corresponds to a location in array 20 at which a red image pixel is located, demosaicking of the shared image signal (i.e., determining image data for each of the nine pixels R1-R5, R7, R9, R10, and R13 based on the single summed charge that spatially corresponds to R4) may be simplified in comparison with demosaicking of image data generated based on a summed signal from a shared floating diffusion node using four pixels of a similar color plane in a three-by-three pixel portion of array 20. For example, in arrangements in which four pixels of the same color plane in a three-by-three pixel portion of array 20 share a common floating diffusion node, the center of gravity of the summed charge will correspond to a pixel 22 of a different color than that of the pixels 22 for which the charge is summed (e.g., the summed charge of pixels R1-R4 will be spatially correspond to pixel B1), which may complicate demosaicking processes used to determine image data for pixels R1-R4. This example is merely illustrative and, in general, any four non-adjacent, commonly colored pixels (e.g., in a three-pixel-by-three-pixel region) in array 20 may share a common floating diffusion node, any nine non-adjacent, commonly colored pixels (e.g., in a five-pixel-by-five-pixel region) in array 20 may share a common floating diffusion node, a set of 12 non-adjacent, commonly colored pixels (e.g., in a five-pixel-by-seven-pixel region) in array 20 may share a common floating diffusion node, etc.

In another suitable arrangement, eight pixels 22 in pixel array 20 that each generate image signals in response to the same color of light may share a common floating diffusion region. In this scenario, the eight pixels 22 may be arranged in three columns and seven rows in pixel array 20. For example, each of pixels R1-R4 and R9-R12 may share a common floating diffusion node. In other words, two adjacent sets of four pixels that generate charge in response to the same color of light (e.g., R1-R4 and R9-R12) may share a common floating diffusion node, three adjacent sets of four pixels that generate charge in response to the same color of light (e.g., R1-R4, R5-R8, and R9-R12) may share a common floating diffusion node, four adjacent sets of four pixels that generate charge in response to the same color of light (e.g., R1-R4, R5-R8, R9-R12, and R13-R16) may share a common floating diffusion node, etc.

In yet another example, four pixels 22 in pixel array 20 that each generate image signals in response to a first color of light may share a common floating diffusion region with four pixels 22 in pixel array 20 that each generate image signals in response to a second color of light. In this scenario, the eight pixels 22 may be arranged in three columns and four rows in pixel array 20. For example, pixels R1-R4 may share a common floating diffusion node 54 with pixels G5-G8. In such an arrangement, charge generated by pixels R1-R4 may be summed at the shared floating diffusion node at a first point in time and subsequently read out, and charge generated by pixels G5-G8 may be summed at the shared floating diffusion node at a second point in time and subsequently read out.

In the example of FIG. 4 described above, sets of non-adjacent pixels that generate charge in response to the same color of light share a common floating diffusion node. For example, pixels R1-R4 are arranged in non-adjacent rows and non-adjacent columns (e.g., pixels R1 and R2 are separated by pixel G1, pixels R2 and R4 are separated by pixel G6, etc.).

The examples described above, however, are merely illustrative. If desired, pixels in any suitable arrangement in pixel array 20 may share a common floating diffusion node. In general, any charge accumulated at any pixels that share a common floating diffusion node may be individually transferred to the shared floating diffusion node and individually read out in any desired order or combination. Similarly, any charges or combinations of charges accumulated at any pixels that share a common floating diffusion node may be individually or simultaneously transferred to the shared floating diffusion node in any desired order such that any desired combination of charges from any desired combination of pixels that share a common floating diffusion node may be summed on the floating diffusion node. Any charges stored on a shared floating diffusion node may be read out to generate a single signal indicative of any desired combination of charges generated by the pixels that share the common floating diffusion node. Although the illustrative examples above are described in terms of specific pixel colors, similar arrangements may be implemented using pixels of different colors (e.g., any examples described in connection with pixels R1-R4 may be implemented using pixels B1-B4, G1-G4, G5-G8, etc., and/or with any other group or groups of image pixels 22 that share a common floating diffusion node). In general, sets of non-adjacent pixels of a similar color plane that share a common floating diffusion node may extend across all or part of pixel array 20.

Figure 5:
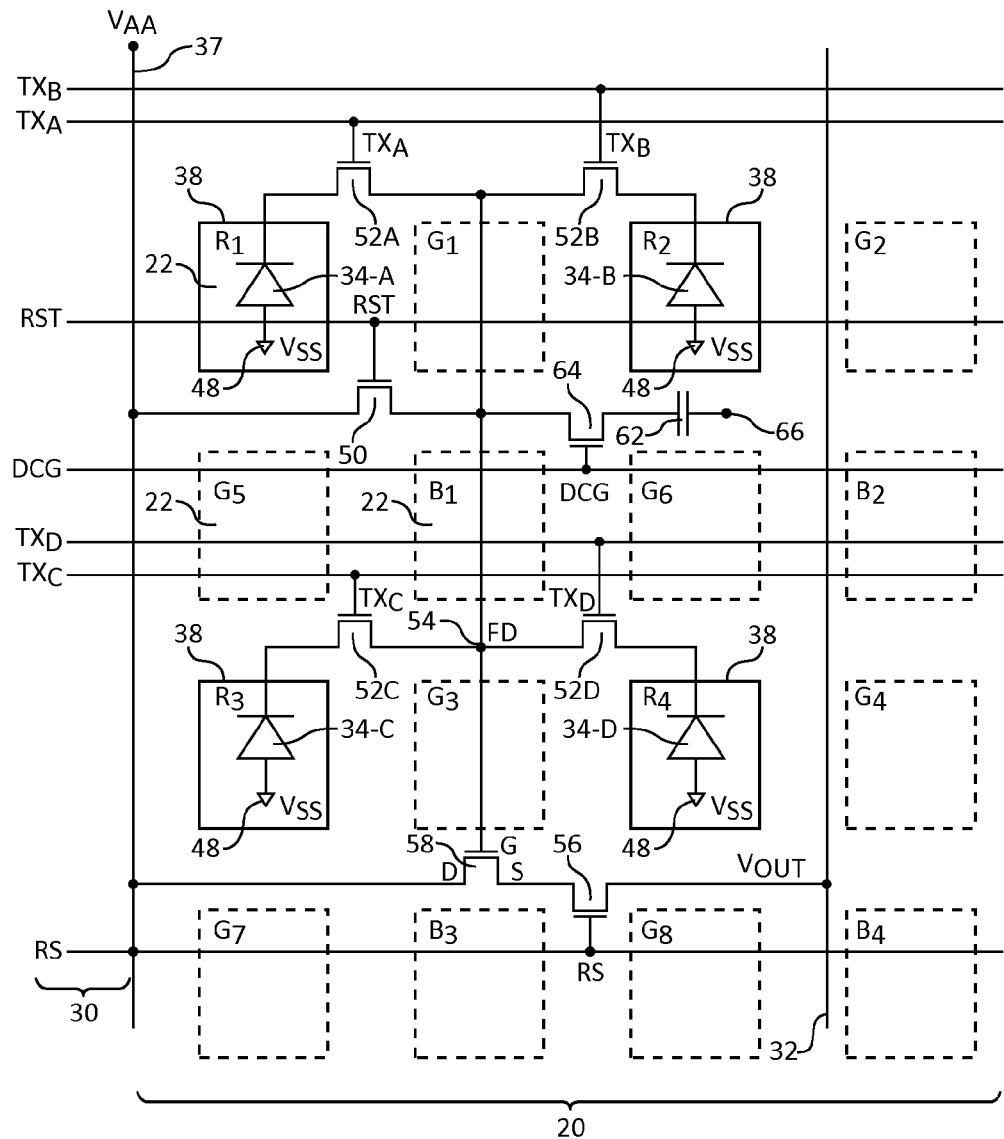
FIG. 5 is a circuit diagram of a portion of an illustrative image sensor pixel array having multiple non-adjacent pixels that share a common floating diffusion node in accordance with an embodiment of the present invention.

FIG. 5 is a circuit diagram of a portion of an illustrative image sensor pixel array 20 having image pixels 22 with photosensitive regions 34. As shown in FIG. 5, image pixels 22 may include photosensitive regions (photosensitive elements) such as photodiodes 34 (e.g., a first photodiode 34-A, a second photodiode 34-B, a third photodiode 34-C, and a fourth photodiode 34-D). A positive power supply voltage (e.g., voltage Vaa or another reset-level voltage) may be supplied at positive power supply terminal 37. A ground power supply voltage (e.g., Vss) may be supplied at ground terminals 48. Incoming light may be collected by photosensitive elements such as photodiodes 34 after passing through corresponding color filter structures such as color filter elements 38.

In the example of FIG. 5, each of pixels R1, R2, R3, and R4 (which include photodiodes 34-A, 34-B, 34-C, and 34-D, respectively) are provided with a respective red (R) color filter element 38 so that photodiodes 34 generate charge in response to red light. Other image pixels 22 in array 20 may be provided with different color filter elements. For example, pixels G1-G4 and G5-G8 may each be provided with a green color filter element, and pixels B1-B4 may each be provided with a blue color filter element. Although not shown in FIG. 5, each of pixels G1-G4 and G5-G8 may be provided with a respective photodiode 34 that generates charge in response to green light. Similarly, each of pixels B1-B4 may be provided with a respective photodiode 34 that generates charge in response to blue light. In other words, array 20 may include an array of photodiodes (photosensitive regions) 34. Photodiodes 34 may form a three-photodiode-by-three-photodiode region corresponding to the nine pixels that include the nine photodiodes in the three-photodiode-by-three photodiode region. The three-photodiode-by-three-photodiode region may include a set of four non-adjacent photodiodes 34 that each generate charge in response to a given color of light (e.g., photodiodes 34-A, 34-B, 34-C, and 34-D corresponding to pixels R1-R4).

If desired, control circuitry 26 (as shown in FIG. 2) may assert reset control signal RST before an image is acquired. This turns on reset transistor 50 and resets charge storage node 54 (also referred to as floating diffusion node FD or floating diffusion region FD) to Vaa or another reset-level voltage. Floating diffusion node 54 may be shared by each of photodiodes 34-A, 34-B, 34-C, and 34-D (i.e., the photodiodes of pixels R1-R4) and may store charge generated by each of photodiodes 34-A, 34-B, 34-C, and 34-D. Charge storage node 54 may be implemented using a region of doped semiconductor (e.g., a doped silicon region formed in a silicon substrate by ion implantation, impurity diffusion, or other doping techniques). The doped semiconductor region (i.e., the floating diffusion node FD) exhibits a capacitance that can be used to store the charge that has been transferred from photodiodes 34 in pixels R1-R4 (e.g., region 54 may have a corresponding charge capacity indicative of the amount of charge that can be stored at region 54). The signal associated with the stored charge on shared charge storage region 54 is conveyed to row select transistor 56 by source-follower transistor 58.

Each photodiode 34 in pixels R1-R4 may be coupled to shared charge storage region 54 through a corresponding charge transfer gate 52 (e.g., a first charge transfer gate 52-A may be coupled between photodiode 34-A and node 54, a second charge transfer gate 52-B may be coupled between photodiode 34-B and node 54, a third charge transfer gate 52-C may be coupled between photodiode 34-C and node 54, and a fourth charge transfer gate 52-D may be coupled between photodiode 34-D and node 54). Control circuitry 26 may provide corresponding charge transfer control signals TX to the gate terminal of each charge transfer gate 52 (e.g., may provide a first charge transfer control signal $TX_A$ to charge transfer gate 52-A, may provide a second charge transfer control signal $TX_B$ to charge transfer gate 52-B, etc.).

The reset control signal RST may be deasserted to turn off reset transistor 50. After the reset process is complete, transfer gate control signals TX may be asserted to turn on corresponding transfer gates 52. When transfer transistors 52 are turned on, the charge that has been generated by the corresponding photodiode 34 in response to incoming light is transferred to shared floating diffusion node 54. Transfer gates TX may be pulsed once to perform one charge transfer operation or may be pulsed multiple times to perform multiple charge transfer operations (e.g., to extend the effective charge well capacity of the corresponding photodiodes). For example, photodiodes may generate an amount of charge that exceeds the charge well capacity of the photodiode such that "overflow" charge needs to be read out in order to ensure that all of the charge generated by the photodiode may be accounted for in the output signal. In such a scenario, one or more of the photodiodes may generate a first amount of charge and subsequently transfer the generated charge to the shared floating diffusion node at a first time and may generate a second amount of charge and subsequently transfer the generated charge at a second time after the first time. If multiple pixels that share a common floating diffusion node each generate "overflow" charge, the "overflow" charges may be transferred to and summed at the shared floating diffusion node and subsequently read out as a single signal. When it is desired to read out the value of the stored charge (i.e., the value of the stored charge that is represented by the signal at the source S of transistor 58), row select control signal RS may be asserted. When signal RS is asserted, transistor 56 turns on and a corresponding image signal $V_{OUT}$ that is representative of the magnitude of the charge on shared floating diffusion node 54 (e.g., a reset-level or an image-level voltage from a photodiode 34 in pixel 22) is produced on output path 32. In a typical configuration, there are numerous rows and columns of image pixels such as image pixel 22 in image pixel array 20. When row select control signal RS is asserted in a given row, a path such as column line 32 may be used to route signal $V_{OUT}$ from that image pixel to readout circuitry such as image readout circuitry 28 of FIG. 2. If desired, reset-levels and image-levels may be sampled, held, and converted for each image pixel 22 to allow for kTc reset noise compensation, for example.

If desired, pixel array 20 may be operated in so-called "low resolution" and "high resolution" modes. In the low resolution mode, charge is transferred (e.g., constructively transferred) from each of photodiodes 34-A, 34-B, 34-C, and 34-D to shared charge storage region 54 and image signals corresponding to a sum of the transferred charges (e.g., the charge generated by each of photodiodes 34) is stored at region 54 and read out over column line 32. For example, charge may be transferred from each of photodiodes 34-A, 34-B, 34-C, and 34-D to shared charge storage node 54 simultaneously. Image signals corresponding to a sum of the transferred charges may enable greater signal-to-noise ratio (SNR) relative to image signals read out using the high resolution mode and may reduce power consumption, but may sacrifice spatial resolution in the final image. In the high resolution mode, charge is transferred to shared charge storage node 54 from a single photodiode 34-A, 34-B, 34-C, or 34-D at a time, and image signals corresponding to the charge generated by each photodiode 34 are separately read out and sampled over column line 32 by readout circuitry 28. Image signals read out separately for each photodiode 34 in pixel 22 (e.g., in the high resolution mode) may allow for improved spatial resolution in the final image (e.g., demosaicked images produced using readout circuitry 28) relative to image signals read out in the low resolution mode.

If desired, multiple pixels 22 having green color filter elements (e.g., pixels G1-G4 and/or G5-G8) as shown in FIG. 5 may share a common floating diffusion node 54 as described above in connection with pixels R1-R4. For example, circuitry as shown in connection with pixels R1-R4 in FIG. 5 may be used to provide pixels G1-G4 and/or G5-G8 with a shared floating diffusion node. Multiple pixels 22 having blue color filter elements (e.g., pixels B1-B4) as shown in FIG. 5 may share a common floating diffusion node 54 as described above in connection with pixels R1-R4. For example, circuitry as shown in connection with pixels R1-R4 in FIG. 5 may be used to provide pixels B1-B4 with a shared floating diffusion node. If desired, each of pixel sets R1-R4, G1-G4, G5-G8, and B1-B4 may be provided with a common floating diffusion using circuitry as shown in connection with pixel group R1-R4 in FIG. 5. Groups of four non-adjacent pixels having a common color filter and a shared floating diffusion node may be extended across part or all of pixel array 20, if desired. In other words, some or all of pixels 22 in pixel array 20 may share a floating diffusion node with other non-adjacent pixels having same color filter elements of the same color using circuitry of the type shown in connection with FIG. 5.

As shown in FIGS. 4 and 5, pixels R1-R4, G1-G9, and B1-B4 may be formed in a Bayer mosaic pattern. In this way, pixel array 20 may operate in a high resolution mode in which each of pixels R1-R4, G1-G4, G5-G9, and B1-B4 individually transfer charge to their respective shared floating diffusion nodes 54 such that the charge generated by each pixel 22 is individually read out to generate an image having a resolution similar to or identical to that of an image generated by a conventional pixel array having pixels arranged in a Bayer mosaic pattern in which charge generated by each pixel in the array is separately read out. In a low resolution mode, charge from pixels R1-R4, G1-G4, G5-G9, and B1-B4 may be summed at their respective shared floating diffusion nodes 54 such that the summed charge is read out as a summed signal. In this way, power consumption of the image sensor 16 may be reduced by the use of a shared floating diffusion node while still providing image data generated by pixels 22 arranged in a Bayer mosaic pattern.

The example of FIGS. 4 and 5 are merely illustrative. If desired, pixels 22 may be provided with color filter elements of any desired colors (e.g., the red, green, and blue color filter elements of FIGS. 4 and 5 may be replaced with infrared color filter elements, ultraviolet color filter elements, red color filter elements, blue color filter elements, magenta color filter elements, cyan color filter elements, clear color filter elements, yellow color filter elements, etc.). Limitations of signal to noise ratio (SNR) that are associated with the Bayer Mosaic pattern can make it difficult to reduce the size of image sensors such as image sensor 16. In one suitable arrangement that is sometimes discussed herein as an example, the green color filter elements shown in FIGS. 4 and 5 are replaced by broadband color filter elements. For example, array 20 as shown in FIGS. 4 and 5 may include a red pixel 22 formed diagonally opposite a blue pixel 22 and adjacent to a broadband pixel 22 that is diagonally opposite to and additional broadband pixel 22.

Pixels 22 may be provided with gain selection circuitry that enhances the dynamic range of the images produced by image sensor 16. For example, each pixel may generate a corresponding output value using a selected gain setting. In some configurations, a selected gain setting may depend on the amount of light captured by the pixel during an exposure (i.e., an integration period between resets of the pixel during which a photosensitive element generates charges in response to incoming light). In other configurations, the gain may be kept at a constant setting. As shown in FIG. 5, image pixel 22 may include capacitor 62 and transistor 64 coupled in series between terminal 66 and shared floating diffusion node 54. In one suitable arrangement, terminal 66 may be coupled to positive power supply voltage Vaa. In another suitable arrangement, terminal 66 may be coupled to ground power supply Vss. Transistor 64 may have a gate terminal that is controlled using dual conversion gain signal DCG. Pixels 22 (e.g., pixels R1-R4) may be operable in a high conversion gain mode and in a low conversion gain mode. If transistor 64 is disabled (e.g., if signal DCG is low), pixels 22 are placed in the high conversion gain mode. If transistor 64 is enabled (e.g., if signal DCG is high), pixels 22 are placed in the low conversion gain mode.

In general, pixel conversion gain is inversely proportional to the amount of loading capacitance at node FD. When transistor 64 is turned on, capacitor 62 is switched into use in order to provide shared floating diffusion node 54 with additional capacitance (e.g., additional charge storage capacity). This results in a lower conversion gain for pixels 22. When transistor 64 is turned off, the additional loading of capacitor 62 is removed and pixels 22 reverts to a relatively higher pixel conversion gain configuration. If desired, pixels 22 may be operated in high conversion gain mode (e.g., transistor 64 may be turned off) when operating in the high resolution mode and may be operated in low conversion gain mode (e.g., transistor 64 may be turned on) when operating in the low resolution mode (e.g., because total transferred charge stored on node 54 will be less when reading out individual photodiodes 34 in the high resolution mode than compared to the sum of charges transferred by each photodiode 34 to node 54 in the low resolution mode). In this way, low conversion gain may be provided to accommodate charge summing (multiple pixel) readout when operating in the low resolution mode, for example.

If desired, image sensor 16 may be operated in a high-dynamic-range imaging mode. The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure (ME)) process. In a multiple exposure process, multiple images (sometimes referred to as image frames) of the same scene may be captured using different exposure times (sometimes referred to as integration times). A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image which is able to represent the brightly lit as well as the dark portions of the image.

In another suitable arrangement, HDR images may be captured by a digital camera using an interleaved integration (or interleaved exposure (IE)) process. In an interleaved integration process, images having rows of long-exposure image pixel values are interleaved with rows of short-exposure image pixel values. The long-exposure and short-exposure image pixel values in each interleaved image frame may be interpolated to form interpolated values. A long-exposure image and a short-exposure image may be generated using the long-exposure and the short-exposure values from the interleaved image frame and the interpolated. The long-exposure image and the short-exposure image may be combined to produce a composite HDR image which is able to represent the brightly lit as well as the dark portions of the image.

If desired, pixels 22 may be operated with selected integration times to generate short and long exposure images for generating an HDR image. FIG. 4 illustrates an exemplary arrangement of pixels 22 in a Bayer mosaic pattern that may be provided with different integration (exposure) times. Pixels 22 may have any desired charge storage node sharing scheme. In one suitable example, pixels R1-R4 share a common floating diffusion node. In such an arrangement, groups of pixels G1-G4, G5-G9, and B1-B4 may also respectively share common floating diffusion nodes (e.g., one shared floating diffusion node per group of four non-adjacent pixels of that generate image signals in response to a given color of light). If desired, red pixel R1 may capture charge using a first integration time, red pixel R2 may capture charge using a second integration time, red pixel R3 may capture charge using a third integration time, red pixel R4 may capture charge using a fourth integration time, green pixel G1 may capture charge using a fifth integration, green pixel G2 may capture charge using a sixth integration time, green pixel G5 may capture charge using a seventh integration time, blue pixel B1 may capture charge using an eighth integration time, etc. Each integration time used by each pixel 22 may be different, or multiple pixels 22 may use common integration times. In one suitable example, each pixel 22 may capture charge either during a long integration time or a short integration time. For example, pixels 22 in the first and third rows of the portion of array 20 shown in FIG. 4 may capture charge using a short integration time, whereas the second and fourth rows of the portion of array 20 shown in FIG. 4 may capture charge using a long integration time. In another suitable arrangement, four different integration times, eight different integration times, sixteen different integration times, more than two integration times, or any other desired integration times may be used to capture charge using pixels 22.

If desired, the integration times used by at least two of pixels R1-R4 may be the same. For example, the integration time used for pixel R1 may be equal to the integration time used for pixel R4. If desired, the integration time used by pixel R2 may be equal to the integration time used by pixel R3. In another example, the integration time for pixel R1 may be equal to the integration time used by pixel R2. If desired, the integration time used by pixel R3 may be equal to the integration time used by sub-pixel R4. In yet another example, the integration time for pixel R1 may be equal to the integration time used by pixel R3. If desired, the integration time used by pixel R2 may be equal to the integration time used by pixel R4. In general, any combination of pixels R1-R4 may use similar or different integration times (e.g., R1-R3 may use the same integration time, and R4 may use a different integration time, etc.). If desired, charge generated at each of pixels R1-R4 using the same integration time may be summed at the shared floating diffusion node and subsequently read out as a summed signal. For example, in the illustrative example in which pixels R1 and R4 use a first integration time and pixels R2 and R3 use a second integration time, charge generated at pixels R1 and R4 during the first integration time may be summed at a shared floating diffusion node and subsequently read out. Similarly, charge generated at pixels R2 and R3 during the second integration time may be summed at the shared floating diffusion node and subsequently read out.

If desired, at least two of pixels R1-R4 that use the same integration time may be diagonally opposed from each other (e.g., pixels R1 and R4) such that the center of gravity of the summed signal is located at the spatial center of the pixels R1-R4. In such an arrangement, it may be desirable to alternate the diagonal orientation of the pixels that use the same integration time between adjacent clusters of four non-adjacent image pixels that share respective floating diffusion nodes. As shown in FIG. 4, for example, pixels R1 and R4 may use the same integration time and share a common floating diffusion node on which charge generated during the shared integration time is summed. In an adjacent group of pixels that also shares a common floating diffusion node (e.g., pixels G1-G4), two pixels having an opposite diagonal orientation to that of R1 and R4 (e.g., pixels G2 and G3) may use the same integration time and sum the charges generated during the shared integration time at a floating diffusion node shared by pixels G1-G4. The integration times used by pixels the R1/R4 and G2/G3 pixels pairs may be the same or different. In another suitable arrangement, the orientation between diagonal pixels that use the same integration time may be alternated between adjacent sets of four pixels of the same color plane. For example, pixels R1 and R4 may use the same integration time and share a common floating diffusion node on which charge generated during the shared integration time is summed. In an adjacent group of four red pixels (e.g., pixels R5, R6, R7, and R8 shown in FIG. 4), two pixels having an opposite diagonal orientation (e.g. pixels R6 and R7) may use the same integration time and share a common floating diffusion node on which charge generated during the shared integration time is summed. The integration times used by pixels the R1/R4 and R6/R7 pixels pairs may be the same or different. If desired, pixels R1 and R7 may use the same integration time, and the pixels R4 and R6 may use the same integration time. Alternating the diagonal orientation of pixels that use the same integration time between clusters of pixels that share a common floating diffusion node may provide image sensor 16 with improved blooming and cross-talk performance.

The examples described above in connection with pixels R1-R4 are merely illustrative. If desired, integration times used by any combination pixels in groups G1-G4, G5-G8, and B1-B4 (as examples) may be the same. For example, any of pixels G1-G4, G5-G8, and/or B1-B4 may use a common integration time as described above in connection with pixels R1-R4. If desired, pixels in different groups (e.g., pixels in group R1-R4 and pixels in group G1-G4, G5-G8, and/or B1-B4) may use the same integration time. For example, pixels R1 and G1 may use the same integration time, pixels R2 and G2 may use the same integration time, pixels R1 and B1 may use the same integration time, pixels R3, B3, and G3 may use the same integration time, pixels R4, G4, G8, and B4 may use the same integration time, pixels R1, G1, R2, and G2 may use the same integration time, etc. In general, any suitable arrangement of pixels 22 in array 20 may be configured to generate images using similar or different integration times.

Integration time may be controlled on array 20 by, for example, controlling the timing of reset signals RST and charge transfer signals TX provided to pixels 22. If desired, an effective integration or effective exposure level (e.g., an effective amount of charge that can be captured by photodiodes 34) may be controlled by adjusting the control signals provided to pixels 22, by forming some pixels with masking layers such as masking layers 40 and 42 of FIG. 3 (e.g., layers which limit the amount of light received by some photodiodes 34 relative to photodiodes 34 without masking layers), by adjusting the shape or arrangement of lenses 14 or 44 (e.g., so that some pixels 22 receive more image light than other pixels 22), by adjusting the size of the corresponding photodiode 34, by providing different color filter elements 38 to each pixel 22 (e.g., so that some pixels 22 capture more light relative to other pixels 22), etc. In general, image signals generated by pixels 22 having different effective exposure levels may be used for generating HDR images (e.g., pixels 22 may generate effective long exposure images and effective short exposure images that may be combined to generate an HDR image, etc.). By generating HDR images using pixels 22 as described above, pixels 22 in the same row of array 20 may use different integration times. The spatial resolution of the final HDR image generated in this manner may be improved (e.g., anisotropic artifacts may be reduced) relative to final images generated by image sensors that use alternating pairs of pixel rows to capture short and long exposure images.

In some scenarios, a neutral density is added in the color filter volume to make some pixels 22 less sensitive (e.g., to provide different effective exposure levels across array 20). In this example, a longer integration time may be used by the corresponding pixels 22, thereby improving SNR in the darker portions of the scenes, as captured by the regular pixels, while preserving highlight detail in the pixels with added neutral density. This approach may eliminate motion artifacts as the integration time profiles may be nearly identical. In addition, this approach may allow imaging device 10 to accurately capture HDR images of flickering light sources such as light-emitting-diodes (LEDs), whereas in scenarios where a short and long integration time are used to capture an HDR imager of the flickering light source, the short integration time may be too short to capture the flickering LED. However, it may not be possible to disable or remove the addition of neutral density in the color filter volume after array 20 is assembled. In another suitable arrangement, pulsed integration may be used by pixels 22, in which the shortest exposure starts and ends at approximately the same time as the longest exposure but with a duty cycle, thereby reducing the exposure by an amount that can be optimized for the dynamic range of the scene being captured. In this example, motion artifacts may be mitigated because the integration profiles of the short and long integrations span the same time interval.

In another suitable arrangement, color filter elements 38 provided to each pixel 22 in array 20 may transmit a different bandwidth (spectrum) of light. For example, the color filter element formed over pixel R1 may pass a first band of red light to the corresponding photodiode, the color filter element formed over pixel R2 may pass a second band of red light to the corresponding photodiode, the color filter element formed over pixel R3 may pass a first band of red light to the corresponding photodiode, etc. If desired, the full spectrum of red colors may be divided among the color filters formed over pixels R1-R4 (e.g., by forming the corresponding color filter elements 38 from different materials or materials having different light absorbing components). As an example, blue pixels B1 and B4 may include color filter elements that transmit light having a wavelength of 400-450 nm, whereas blue pixels B2 and B3 may include color filter elements that transmit light having a wavelength of 450-500 nm (thereby covering the entire spectrum of blue light from 400-500 nm). In another example, blue pixels B1 and B4 may include color filter elements that transmit light having a wavelength from 400-500 nm, whereas blue pixel B2 may include a color filter element that transmits light having a wavelength from 400-450 nm and blue pixel B3 may include a color filter element that transmits light having a wavelength from 450-500 nm. In this way, additional spectral information useful for improving color reproduction and/or image processing algorithms may be obtained. Similar filters may be implemented for the other colored pixels 22 in array 20.

Figure 6:
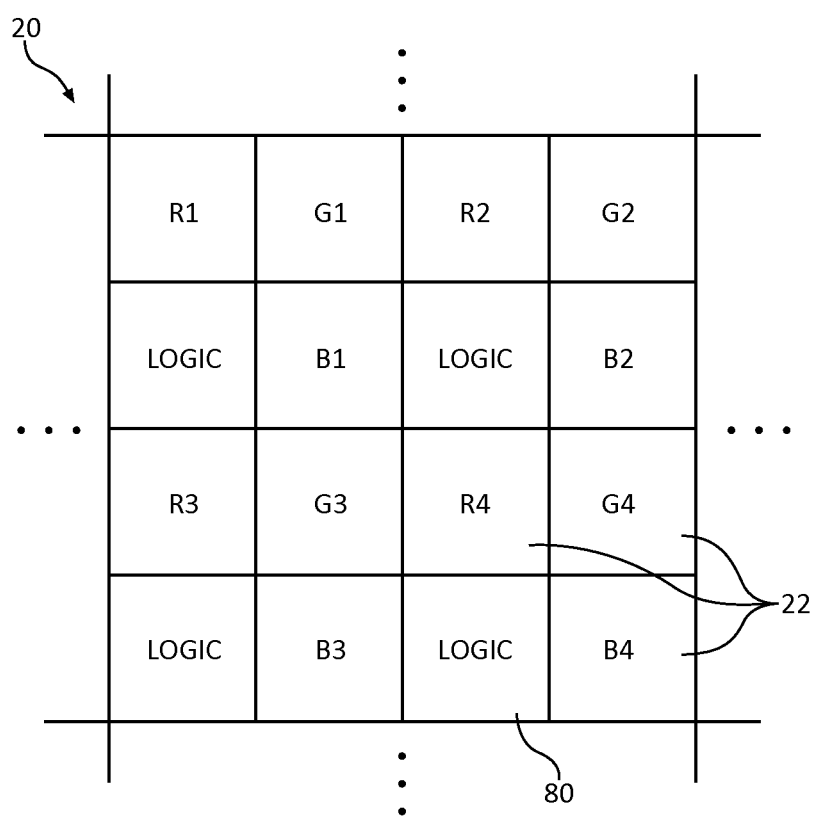
FIG. 6 is a diagram of an illustrative pixel array having multiple non-adjacent pixels with shared charge storage nodes and corresponding logic circuitry at predetermined pixel locations within the array in accordance with an embodiment of the present invention.

If desired, one or more pixels 22 on array 20 may be replaced with pixel logic circuitry. FIG. 6 is an illustrative diagram showing how each pixel in a cluster of pixels that is configured to share a common floating diffusion node (e.g., G5-G8) may be replaced with pixel logic circuitry 80. Logic circuitry 80 may include, for example, reset gate 50, DCG gate 64, source follower 58, row-select gate 56, or any other desired pixel logic associated with corresponding pixels 22. Readout circuitry 28 of FIG. 2 may, for example, interpolate image signals for the pixel locations of logic circuitry 80 during image processing (e.g., while operating in the high resolution mode). Interpolation of image signals for pixel locations of logic circuitry 80 may be omitted in the low resolution mode. The example shown in FIG. 6, however, is merely illustrative. If desired, other pixels 22 in image pixel array 20 may be replaced by logic circuitry 80. In one suitable scenario, one pixel in each of pixel sets R1-R4, G1-G4, G5-G8, and B1-B4 may be replaced by logic circuitry 80. For example, each of pixels R1, B1, G4, and G8 may be replaced by logic circuitry 80. In another suitable example, the pixels in each of groups R1-R4, G1-G4, G5-G8, and B1-B4 that are replaced by logic 80 may be four pixels that form a two-pixel-by-two-pixel unit cell of the Bayer mosaic pattern. For example, each of pixels R1, G1, G5, and B1 may be replaced by logic circuitry 80. In general, logic circuitry 80 may be formed at any desired pixel location and may be formed at randomized locations across array 20 in order to mitigate any image artifacts associated with the missing sub-pixels.

Figure 7:
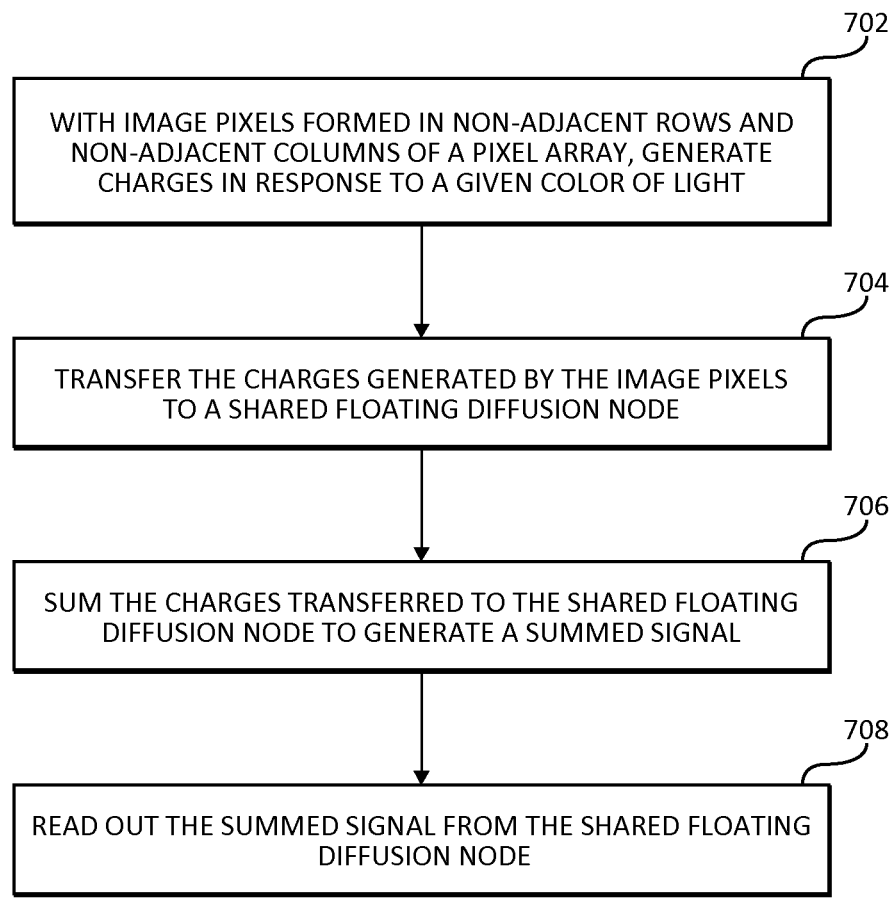
FIG. 7 is a flow chart of illustrative steps that may be performed in operating an image sensor in a low resolution mode in accordance with an embodiment of the present invention.

A flow chart of illustrative steps that may be performed in operating an image sensor 16 in a low resolution mode is shown in FIG. 7.

At step 702, multiple image pixels formed in non-adjacent rows and non-adjacent columns of an image pixel array (e.g., pixels R1-R4 described above in connection with FIGS. 4 and 5) may each generate electrical charge in response to a given color of light (e.g., red light that is transmitted by the red color filter elements formed over each of pixels R1-R4).

At step 704, the charges generated by the image pixels may be transferred to a shared floating diffusion node (e.g., shared floating diffusion node 54 described above in connection with FIG. 5).

At step 706, the charges transferred to the shared floating diffusion node may be summed to generate a summed signal.

At step 708, the summed signal may be read out from the shared floating diffusion node (e.g., the charges generated by each of pixels R1-R4 may be simultaneously read out from the shared floating diffusion node). The summed signal may be used to form a final low resolution image.

Figure 8:
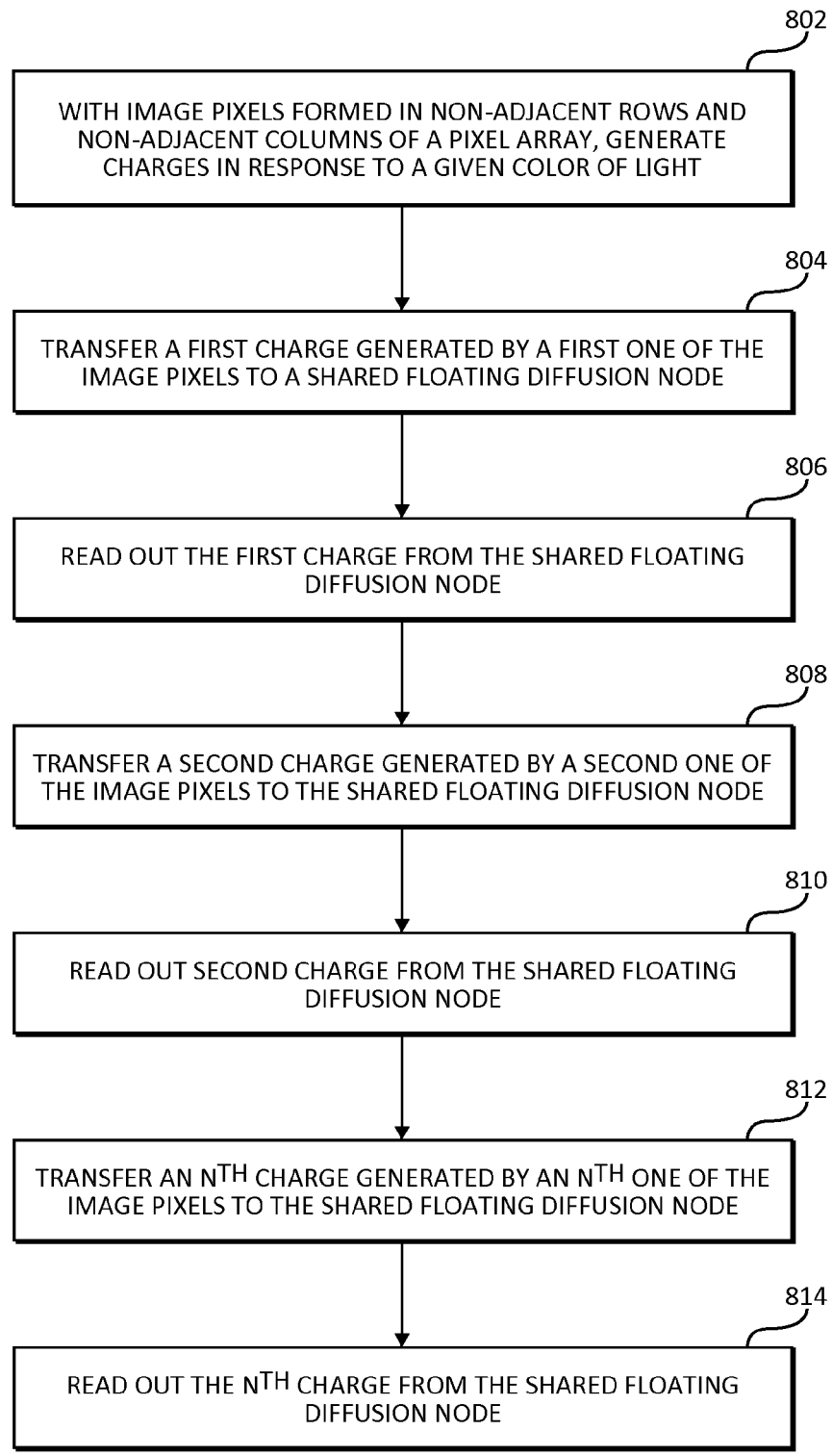
FIG. 8 is a flow chart of illustrative steps that may be performed in operating an image sensor in a full resolution mode in accordance with an embodiment of the present invention.

A flow chart of illustrative steps that may be performed in accordance with operating an image sensor 16 in a full resolution mode is shown in FIG. 8.

At step 802, a plurality of image pixels formed in non-adjacent rows and non-adjacent columns of an image pixel array (e.g., pixels R1-R4 described above in connection with FIGS. 4 and 5) may each generate electrical charge in response to a given color of light (e.g., red light that is transmitted by the red color filter elements formed over each of pixels R1-R4).

At step 804, a first charge generated by a first one of the image pixels (e.g., R1) may be transferred to a shared floating diffusion node (e.g., shared floating diffusion node 54 described above in connection with FIG. 5).

At step 806, the first charge may be read out from the shared floating diffusion node (e.g., the charge generated by R1 may be individually read out from the shared floating diffusion node).

At step 808, a second charge generated by a second one of the image pixels (e.g., R2) may be transferred to the shared floating diffusion node.

At step 810, the second charge may be read out from the shared floating diffusion node (e.g., the charge generated by R2 may be individually read out from the shared floating diffusion node).

At step 812, an $n^{th}$ charge generated by an $n^{th}$ one of the image pixels (e.g., R3, R4, R13, etc.) may be transferred to the shared floating diffusion node.

At step 814, the $n^{th}$ charge may be read out from the shared floating diffusion node (e.g., the charge generated by the $n^{th}$ image pixel may be individually read out from the shared floating diffusion node) and may be used to generate a final full resolution image.

The steps described above in connection with FIGS. 7 and 8 are merely illustrative. In general, charges generated by any suitable image pixels in an image pixel array may be summed at and collectively read out from a shared floating diffusion node and/or may be individually transferred to and individually read out from a shared floating diffusion node.

Figure 9:
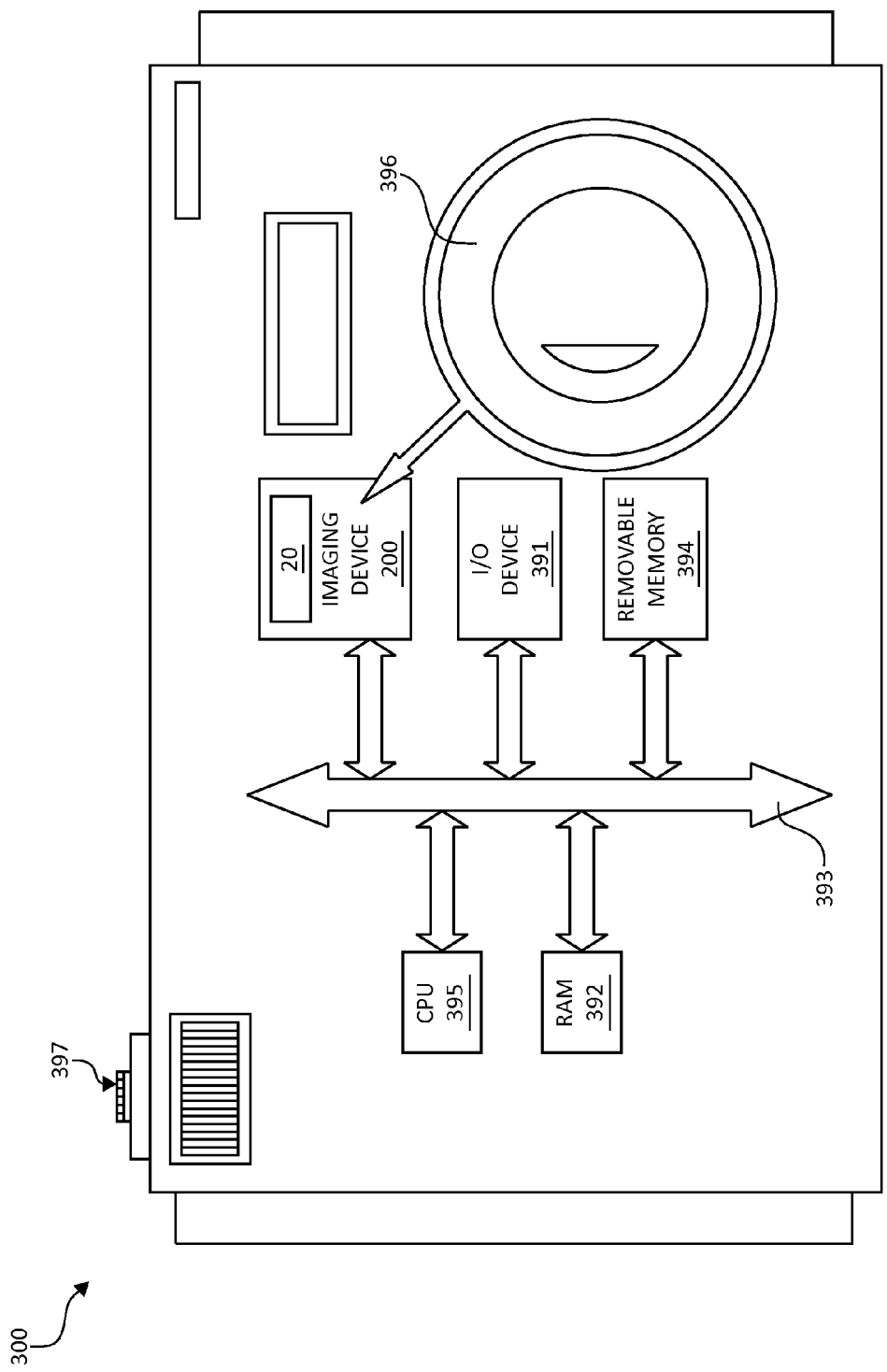
FIG. 9 is a block diagram of a processor system employing the embodiments of FIGS. 1-7 in accordance with an embodiment of the present invention.

FIG. 9 shows in simplified form a typical processor system 300, such as a digital camera, which includes an imaging device 200 (e.g., an imaging device 200 such as device 10 of FIGS. 1-6 and the techniques for capturing images using pixel arrays having photosensitive regions with shared charge storage nodes and sub-pixel resolution capabilities). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

An imaging system may include an array of photodiodes arranged in rows and columns. The array may include a three-photodiode-by-three-photodiode region that includes a set of four non-adjacent photodiodes. The imaging system may include a color filter array having a set of four color filter elements formed over the set of four non-adjacent photodiodes such that each color filter element in the set of four color filter elements is configured to transmit light of a given wavelength band. The imaging system may include a shared floating diffusion node. A pair of the photodiodes in the set of four non-adjacent photodiodes may be formed in a common row of the array may be coupled to the shared floating diffusion node.

If desired, each of the photodiodes in the set of four non-adjacent photodiodes may be coupled to the shared floating diffusion node.

If desired, the array of photodiodes may include an additional three-photodiode-by-three-photodiode region that includes an additional set of four non-adjacent photodiodes, the color filter array may include an additional set of four color filter elements formed over the additional set of four non-adjacent photodiodes such that each color filter element in the additional set of four color filter elements may be configured to transmit light of the given wavelength band, and each of the photodiodes in the additional set of four non-adjacent photodiodes may be coupled to the shared floating diffusion node.

If desired, the three-photodiode-by-photodiode region may be a first three-photodiode-by-three-photodiode region and the array of photodiodes may include an additional three-photodiode-by-three-photodiode region that includes an additional set of four non-adjacent photodiodes. At least two photodiodes in the additional set of four non-adjacent photodiodes may also be included in the first three-photodiode-by-three-photodiode region. The color filter array may include an additional set of four color filter elements formed over the additional set of four non-adjacent photodiodes such that each color filter element in the additional set of four color filter elements may be configured to transmit light of an additional wavelength band that may be different than the given wavelength band. Each photodiode in the second set of four non-adjacent photodiodes may be coupled to the shared floating diffusion node.

If desired, a first photodiode in the set of four non-adjacent photodiodes may be configured to generate a first charge during a first integration time and a second photodiode in the set of four non-adjacent photodiodes may be configured to generate a second charge during a second integration time that may be different than the first integration time.

If desired, a third photodiode in the set of four non-adjacent photodiodes may be configured to generate a third charge during a third integration time that may be different than the first and second integration times.

If desired, a fourth photodiode in the set of four non-adjacent photodiodes may be configured to generate a fourth charge during a fourth integration time that may be different than the first, second, and third integration times.

If desired, the first photodiode and the second photodiode may be diagonally opposed.

If desired, the array of photodiodes may include an additional three-photodiode-by-three-photodiode region that includes an additional set of four non-adjacent photodiodes. The color filter array may include an additional set of four color filter elements formed over the additional set of four non-adjacent photodiodes such that each color filter element in the additional set of four color filter elements may be configured to transmit light of the given wavelength band. Each of the photodiodes in the additional set of four non-adjacent photodiodes may be coupled to an additional shared floating diffusion node. A third photodiode in the additional set of four non-adjacent photodiodes may be configured to generate a third charge during the first integration time and a fourth photodiode in the additional set of four non-adjacent photodiodes may be configured to generate a fourth charge during the second integration time. The third and fourth photodiodes may be diagonally opposed. The first and fourth photodiodes may be formed in a first row of the array of photodiodes and the second and third photodiodes may be formed in a second row of the array of photodiodes.

If desired, first and second photodiodes in the set of four non-adjacent photodiodes may be coupled to the shared floating diffusion node through respective first and second charge transfer gates. The first charge transfer gate may be configured to transfer a first charge from the first photodiode to the shared floating diffusion node and the second charge transfer gate may be configured to transfer a second charge from the second photodiode to the shared floating diffusion node. The imaging system may include readout circuitry coupled to the array. The readout circuitry may be operable in a low resolution mode in which the readout circuitry reads out image signals corresponding to a sum of the first and second charges from the shared charge floating diffusion node and in a high resolution mode in which the readout circuitry reads out image signals corresponding to a given one of the first and second charges from the shared floating diffusion node.

If desired, the imaging system may include a charge storage region coupled to the shared floating diffusion node through a dual conversion gain gate.

If desired, the imaging system may include control circuitry coupled to the array. The control circuitry may be configured to turn on the dual conversion gain gate when the readout circuitry is in the low resolution mode and to turn off the dual conversion gain gate when the readout circuitry is in the high resolution mode.

An imaging system may include an array of image pixels arranged in rows and columns including first, second, and third rows of image pixels. The second row of image pixels may be interposed between the first and third rows of image pixels. The array may include first, second, and third columns of image pixels. The second column of image pixels may be interposed between the first and third columns of image pixels. The array of image pixels may include a cluster of four non-adjacent image pixels. A first image pixel in the cluster may be formed in the first row and the first column, a second image pixel in the cluster may be formed in the first row and the third column, a third image pixel in the cluster may be formed in the third row and the first column, a fourth image pixel in the cluster may be formed in the third row and the third column, and each of the first, second, third, and fourth image pixels may be coupled to a shared charge storage region. The imaging system may include a color filter array formed over the array of image pixels that includes color filter elements configured to transmit a given color of light to each of the first, second, third, and fourth image pixels.

If desired, each of the first, second, third, and fourth image pixels may generate charges in response to the given color of light. The charges generated by each of the first, second, third, and fourth image pixels may be simultaneously stored on the shared charge storage region.

If desired, the charges generated by each of the first, second, third, and fourth image pixels that may be simultaneously stored on the shared charge storage region may be summed to generate a summed charge that may be read out from the shared charge storage region.

If desired, each of the first, second, third, and fourth image pixels may generate charges in response to the given color of light, and each of the charges generated by each of the first, second, third, and fourth image pixels may be stored individually on the shared charge storage region.

If desired, each of the charges generated by each of the first, second, third, and fourth image pixels may be individually read out from the shared charge storage region.

If desired, the array of image pixels may include fourth and fifth rows of image pixels. The fourth row of image pixels may be interposed between the third and fifth rows of image pixels. The array of image pixels may include fourth and fifth columns of image pixels. The fourth column of image pixels may be interposed between the third and fifth columns of image pixels. The array may include a fifth image pixel in the first row and the fifth column, a sixth image pixel in the third row and the fifth column, a seventh image pixel in the fifth row and the first column, an eighth image pixel in the fifth row and the third column, and a ninth image pixel in the fifth row and the fifth column. The color filter array may include color filter elements configured to transmit the given color of light to each of the fifth, sixth, seventh, eighth, and ninth image pixels, and each of the fifth, sixth, seventh, eighth, and ninth image pixels may be coupled to the shared charge storage region.

If desired, the color filter array may include four adjacent color filter elements arranged in a unit cell. The unit cell may include a red pixel diagonally opposed from a blue pixel and a pair of diagonally opposed green pixels.

A system may include a central processing unit, memory, input-output circuitry, and an imaging device. The imaging device may include an array of image pixels that includes a plurality of photosensitive regions arranged in rows and columns. The plurality of photosensitive regions may include a first pair of photosensitive regions formed in non-adjacent columns of a first row of the array and a second pair of photosensitive regions formed in the non-adjacent columns of a second row of the array. The first and second rows may be non-adjacent, and photosensitive regions in the first and second pairs of photosensitive regions may generate charge in response to the same color of light. The imaging system may include a common floating diffusion node. The photosensitive regions in the first and second pairs of photosensitive regions may be configured to transfer the generated charge to the common floating diffusion node.

If desired, the imaging device may include pixel logic circuitry configured to control the array of image pixels. The pixel logic circuitry may include at least one of a reset gate, a source follower transistor, a row select transistor, and a dual conversion gain transistor. At least one of the photosensitive regions in the first and second pairs of photosensitive regions may be replaced by the pixel logic circuitry.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
   an array of photodiodes arranged in rows and columns, wherein the array comprises a three-photodiode-by-three-photodiode region that includes a set of four non-adjacent photodiodes;
   a color filter array, wherein the color filter array comprises a set of four color filter elements formed over the set of four non-adjacent photodiodes, wherein each color filter element in the set of four color filter elements is configured to transmit light of a given wavelength band, wherein the color filter array further comprises at least one color filter element that is configured to transmit light of a wavelength band that is different than the given wavelength band and that is formed over one of the photodiodes in the three-by-three-photodiode region other than the four non-adjacent photodiodes in the set; and
   a shared floating diffusion node, wherein a pair of the photodiodes in the set of four non-adjacent photodiodes is formed in a common row of the array and is coupled to the shared floating diffusion node, and wherein the photodiodes in the three-photodiode-by-three-photodiode region that are not in the set of four non-adjacent photodiodes are not coupled to the shared floating diffusion node.

2. The imaging system defined in claim 1, wherein each of the photodiodes in the set of four non-adjacent photodiodes is coupled to the shared floating diffusion node.

3. The imaging system defined in claim 2, wherein the array of photodiodes further comprises an additional three-photodiode-by-three-photodiode region that includes an additional set of four non-adjacent photodiodes, wherein the color filter array further comprises an additional set of four color filter elements formed over the additional set of four non-adjacent photodiodes, wherein each color filter element in the additional set of four color filter elements is configured to transmit light of the given wavelength band, and wherein each of the photodiodes in the additional set of four non-adjacent photodiodes is coupled to the shared floating diffusion node.

4. The imaging system defined in claim 2, wherein the three-photodiode-by-photodiode region is a first three-photodiode-by-three-photodiode region, wherein the array of photodiodes further comprises an additional three-photodiode-by-three-photodiode region that includes an additional set of four non-adjacent photodiodes, wherein at least two photodiodes in the additional set of four non-adjacent photodiodes are also included in the first three-photodiode-by-three-photodiode region, wherein the color filter array further comprises an additional set of four color filter elements formed over the additional set of four non-adjacent photodiodes, wherein each color filter element in the additional set of four color filter elements is configured to transmit light of an additional wavelength band that is different than the given wavelength band, and wherein each photodiode in the second set of four non-adjacent photodiodes is coupled to the shared floating diffusion node.

5. The imaging system defined in claim 2, wherein a first photodiode in the set of four non-adjacent photodiodes is configured to generate a first charge during a first integration time, and wherein a second photodiode in the set of four non-adjacent photodiodes is configured to generate a second charge during a second integration time that is different than the first integration time.

6. The imaging system defined in claim 5, wherein a third photodiode in the set of four non-adjacent photodiodes is configured to generate a third charge during a third integration time that is different than the first and second integration times.

7. The imaging system defined in claim 6, wherein a fourth photodiode in the set of four non-adjacent photodiodes is configured to generate a fourth charge during a fourth integration time that is different than the first, second, and third integration times.

8. The imaging system defined in claim 5, wherein the first photodiode and the second photodiode are diagonally opposed.

9. The imaging system defined in claim 8, wherein the array of photodiodes further comprises an additional three-photodiode-by-three-photodiode region that includes an additional set of four non-adjacent photodiodes, wherein the color filter array further comprises an additional set of four color filter elements formed over the additional set of four non-adjacent photodiodes, wherein each color filter element in the additional set of four color filter elements is configured to transmit light of the given wavelength band, wherein each of the photodiodes in the additional set of four non-adjacent photodiodes is coupled to an additional shared floating diffusion node, wherein a third photodiode in the additional set of four non-adjacent photodiodes is configured to generate a third charge during the first integration time, wherein a fourth photodiode in the additional set of four non-adjacent photodiodes is configured to generate a fourth charge during the second integration time, wherein the third and fourth photodiodes are diagonally opposed, wherein the first and fourth photodiodes are formed in a first row of the array of photodiodes, and wherein the second and third photodiodes are formed in a second row of the array of photodiodes.

10. The imaging system defined in claim 1 wherein first and second photodiodes in the set of four non-adjacent photodiodes are coupled to the shared floating diffusion node through respective first and second charge transfer gates, wherein the first charge transfer gate is configured to transfer a first charge from the first photodiode to the shared floating diffusion node and the second charge transfer gate is configured to transfer a second charge from the second photodiode to the shared floating diffusion node, the imaging system further comprising:
   readout circuitry coupled to the array, wherein the readout circuitry is operable in a low resolution mode in which the readout circuitry reads out image signals corresponding to a sum of the first and second charges from the shared charge floating diffusion node and in a high resolution mode in which the readout circuitry reads out image signals corresponding to a given one of the first and second charges from the shared floating diffusion node.

11. The imaging system defined in claim 10, further comprising:
   a charge storage region coupled to the shared floating diffusion node through a dual conversion gain gate.

12. The imaging system defined in claim 11, further comprising:
   control circuitry coupled to the array, wherein the control circuitry is configured to turn on the dual conversion gain gate when the readout circuitry is in the low resolution mode, and wherein the control circuitry is configured to turn off the dual conversion gain gate when the readout circuitry is in the high resolution mode.

13. An imaging system, comprising:
   an array of image pixels arranged in rows and columns comprising:
      first, second, and third rows of image pixels, wherein the second row of image pixels is interposed between the first and third rows of image pixels;
      first, second, and third columns of image pixels, wherein the second column of image pixels is interposed between the first and third columns of image pixels; and
      a cluster of four non-adjacent image pixels, wherein a first image pixel in the cluster is formed in the first row and the first column, a second image pixel in the cluster is formed in the first row and the third column, a third image pixel in the cluster is formed in the third row and the first column, a fourth image pixel in the cluster is formed in the third row and the third column, and wherein each of the first, second, third, and fourth image pixels is coupled to a shared charge storage region; and
   a color filter array formed over the array of image pixels that includes color filter elements configured to transmit a given color of light to each of the first, second, third, and fourth image pixels, wherein the color filter array further includes at least one color filter element that is configured to transmit a color of light that is different than the given color to an additional image pixel that is formed in the second row and is interposed between two of the four non-adjacent image pixels in the first column, and wherein the additional image pixel is not coupled to the shared charge storage region.

14. The imaging system defined in claim 13, wherein each of the first, second, third, and fourth image pixels generate charges in response to the given color of light, and wherein the charges generated by each of the first, second, third, and fourth image pixels are simultaneously stored on the shared charge storage region.

15. The imaging system defined in claim 14, wherein the charges generated by each of the first, second, third, and fourth image pixels that are simultaneously stored on the shared charge storage region are summed to generate a summed charge that is read out from the shared charge storage region.

16. The imaging system defined in claim 13, wherein each of the first, second, third, and fourth image pixels generate charges in response to the given color of light, and wherein each of the charges generated by each of the first, second, third, and fourth image pixels is stored individually on the shared charge storage region.

17. The imaging system defined in claim 16, wherein each of the charges generated by each of the first, second, third, and fourth image pixels is individually read out from the shared charge storage region.

18. The imaging system defined in claim 13, the array of image pixels further comprising:
   fourth and fifth rows of image pixels, wherein the fourth row of image pixels is interposed between the third and fifth rows of image pixels;
   fourth and fifth columns of image pixels, wherein the fourth column of image pixels is interposed between the third and fifth columns of image pixels; and
   a fifth image pixel in the first row and the fifth column, a sixth image pixel in the third row and the fifth column, a seventh image pixel in the fifth row and the first column, an eighth image pixel in the fifth row and the third column, and a ninth image pixel in the fifth row and the fifth column, wherein the color filter array includes color filter elements configured to transmit the given color of light to each of the fifth, sixth, seventh, eighth, and ninth image pixels, and wherein each of the fifth, sixth, seventh, eighth, and ninth image pixels are coupled to the shared charge storage region.

19. The imaging system defined in claim 13, wherein the color filter array comprises four adjacent color filter elements arranged in a unit cell, and wherein the unit cell comprises a red pixel diagonally opposed from a blue pixel and a pair of diagonally opposed green pixels.

20. A system, comprising:
   a central processing unit;
   memory;
   input-output circuitry; and
   an imaging device, wherein the imaging device comprises:
      an array of image pixels, wherein the array of image pixels comprises a plurality of photosensitive regions arranged in rows and columns, wherein the plurality of photosensitive regions comprises a first pair of photosensitive regions formed in non-adjacent columns of a first row of the array and a second pair of photosensitive regions formed in the non-adjacent columns of a second row of the array, wherein the first and second rows are non-adjacent, wherein photosensitive regions in the first and second pairs of photosensitive regions generate charge in response to the same color of light, wherein the plurality of photosensitive regions includes a photosensitive region interposed between the first pair of photosensitive regions and includes an additional photosensitive region that is formed in one of the non-adjacent columns and interposed between two of the photosensitive regions in the first and second pairs, and wherein the photosensitive region and the additional photosensitive region generate charge in response to different colors of light than the first pair of photosensitive regions;

a common floating diffusion node, wherein the photosensitive regions in the first and second pairs of photosensitive regions are configured to transfer the generated charge to the common floating diffusion node; and an additional common floating diffusion node, wherein the additional photosensitive region is coupled to the additional common floating diffusion node.

21. The system defined in claim 20, wherein the imaging device further comprises:

pixel logic circuitry configured to control the array of image pixels, wherein the pixel logic circuitry comprises at least one of a reset gate, a source follower transistor, a row select transistor, and a dual conversion gain transistor, and wherein at least one of the photosensitive regions in the first and second pairs of photosensitive regions is replaced by the pixel logic circuitry.

* * * * *